United States Patent [19]
Lent

[11] 3,756,368
[45] Sept. 4, 1973

[54] METHOD AND APPARATUS FOR HANDLING ARTICLES
[75] Inventor: Ralph C. Lent, Lafayette, Calif.
[73] Assignee: Del Monte Corporation, San Francisco, Calif.
[22] Filed: June 7, 1971
[21] Appl. No.: 150,442

Related U.S. Application Data
[63] Continuation-in-part of Ser. No. 7,615, Feb. 2, 1970, Pat. No. 3,682,301.

[52] U.S. Cl. ............ 198/33 AD, 209/102, 209/106
[51] Int. Cl. .......................................... B65g 47/24
[58] Field of Search .................. 198/33 AA, 33 AD; 209/97, 102, 106

[56] References Cited
UNITED STATES PATENTS
3,463,212  8/1969  Morgan .............................. 209/106
3,311,218  3/1967  Lederer ........................... 198/33 AD
3,469,690  9/1969  Ervin ................................. 209/102
1,482,667  2/1924  Van Houten .................. 198/33 AD
1,870,443  8/1932  Cumfer ................................ 198/35
3,682,301  8/1972  Ross ................................ 198/33 AD Primary Examiner—Richard E. Aegerter
Attorney—Flehr, Hohbach, Test, Albritton & Herbert

[57] ABSTRACT

Method and apparatus for handling and orienting elongated articles (e.g., asparagus) having a center of gravity displaced from the geometric center in a direction away from the lighter and toward the heavier end thereof. Employs the principle of tilting articles about their centers of gravity, together with moving surfaces upon which the articles are supported. The articles are caused to tilt with their heavier ends foremost and drop through one or more gaps formed between moving surfaces. Conveyor means collects the articles and delivers them with the desired lengthwise orientation for further processing. In certain embodiments the conveyor means may collect the articles within a given length range. Also in one embodiment the means provided for receiving oriented articles discharging from the orienting apparatus functions to retain the desired orientation in the discharge zone and to convey the articles away from the discharge zone for further processing. An article feeding device incorporates a V-shaped trough feeding a plurality of V-shaped lanes down an incline for controlled feeding of multiple lanes of the orientor apparatus.

8 Claims, 10 Drawing Figures

PATENTED SEP 4 1973 3,756,368
SHEET 1 OF 4
FIG_1
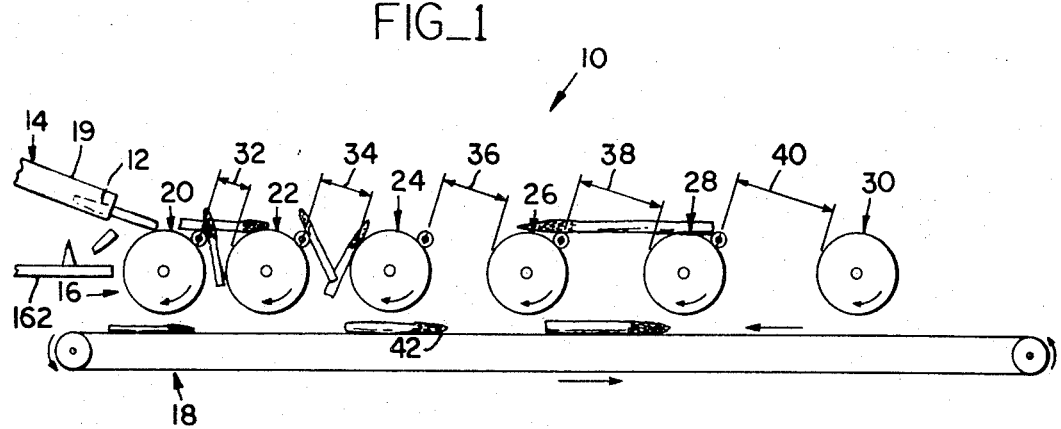
FIG_2
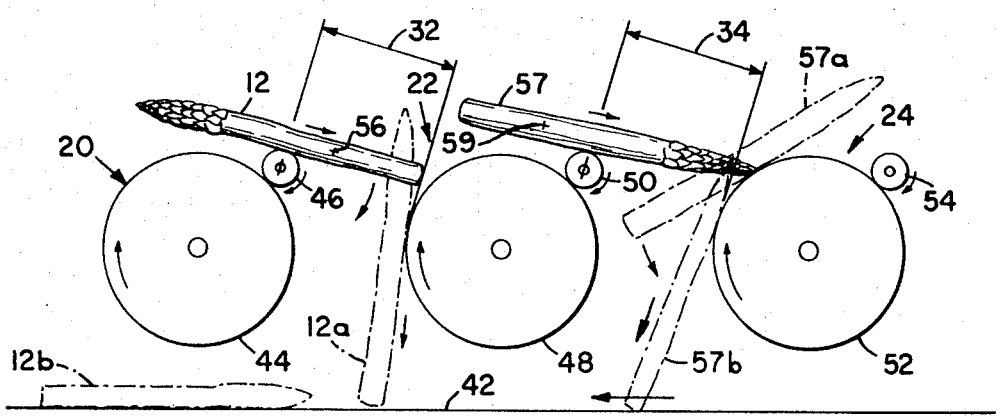
INVENTOR.
RALPH C. LENT
BY Flehr, Hohbach, Test,
Albritton & Herbert
ATTORNEYS

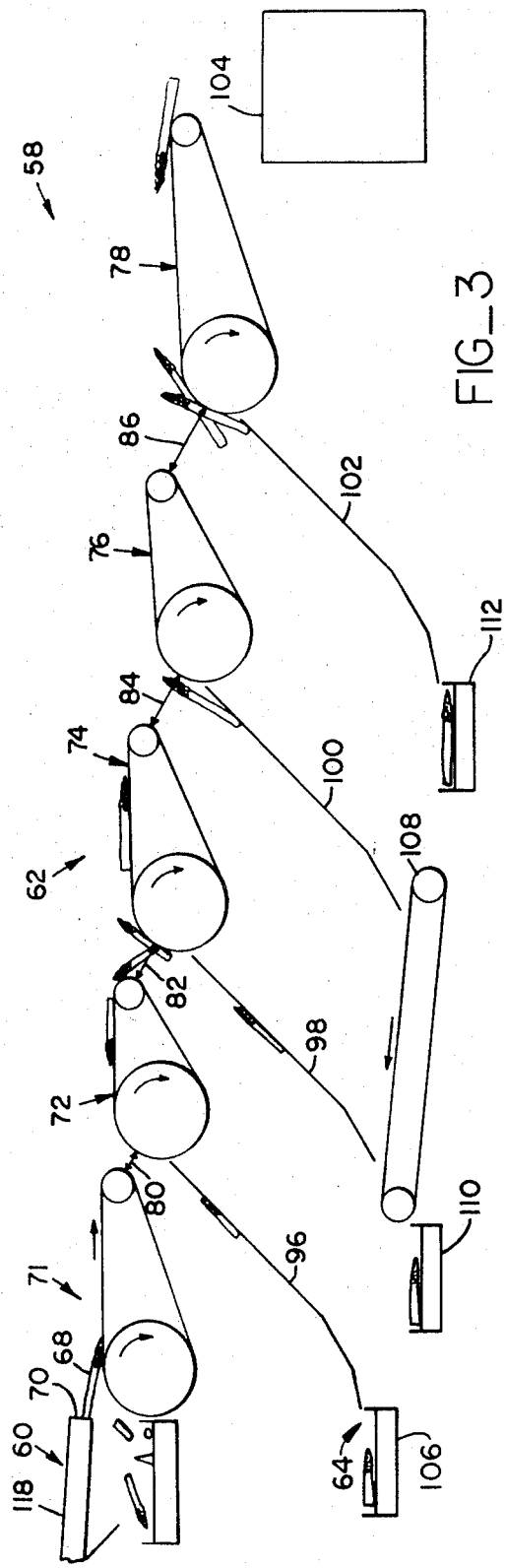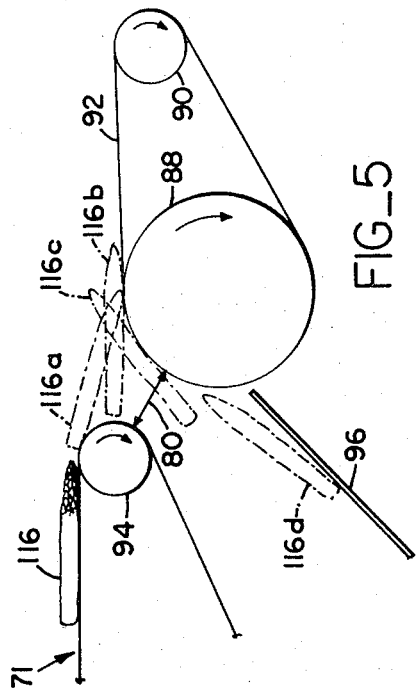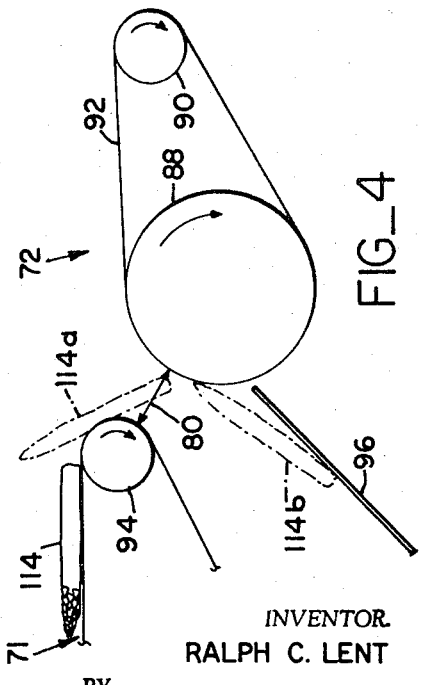

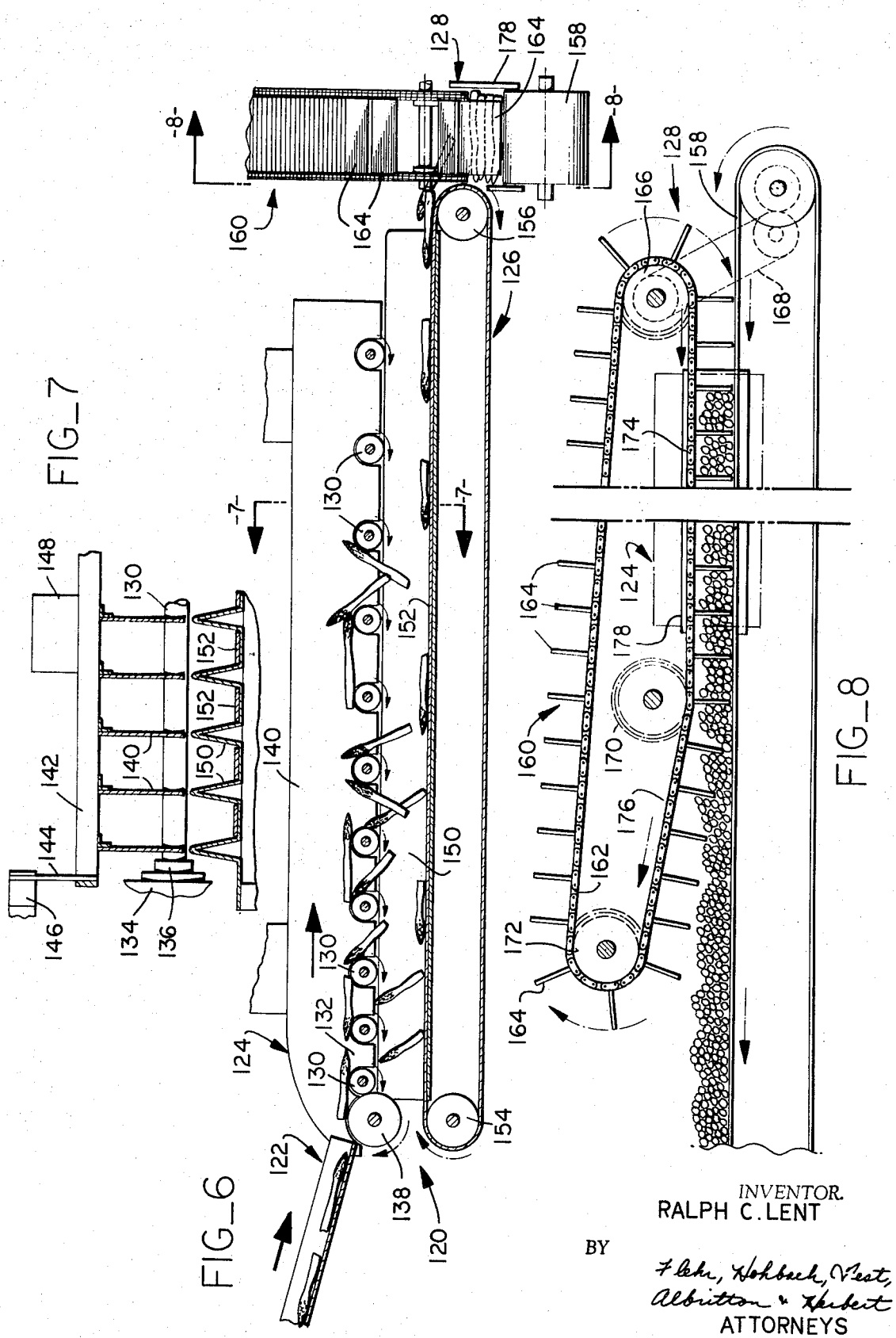

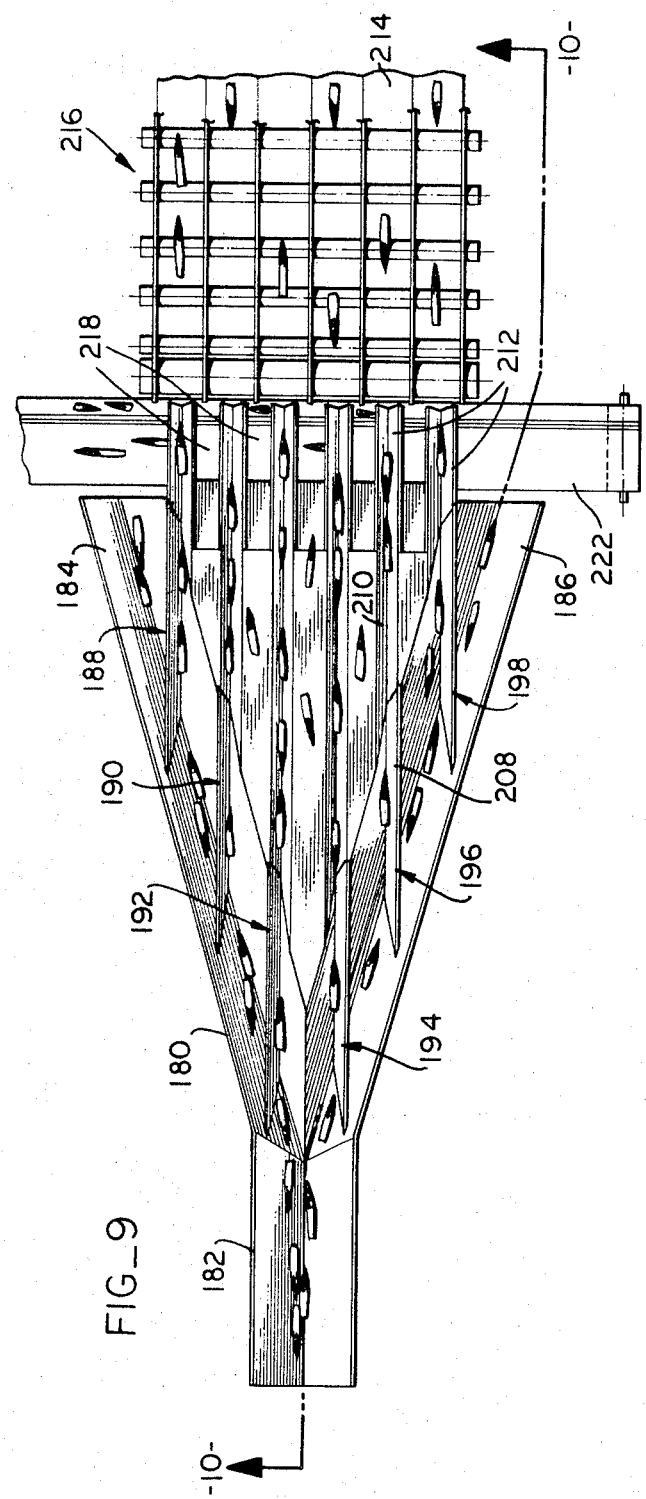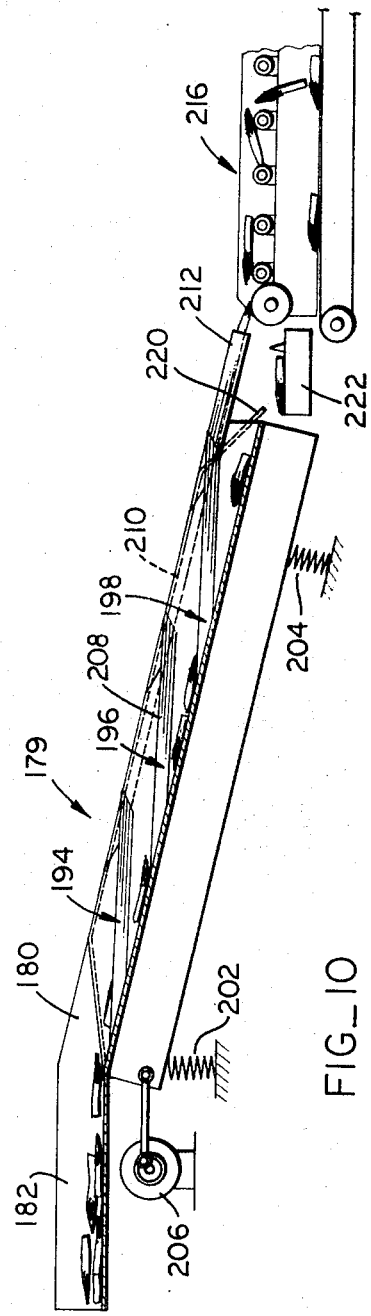

METHOD AND APPARATUS FOR HANDLING ARTICLES

CROSS REFERENCE TO RELATED APPLICATION

This application is a continuation-in-part of copending U.S. Pat. application Ser. No. 7,615 filed Feb. 2, 1970, now U.S. Pat. No. 3,682,301, issued Aug. 8, 1972.

BACKGGROUND OF THE INVENTION

This invention relates generally to methods and apparatus for handling elongated articles having a center of gravity displaced lengthwise from the geometric center. More particularly the invention relates to methods and apparatus for handling elongated articles such as agricultural products, including asparagus, husked corn, carrots and the like.

In conventional processing methods and apparatus for handling articles of the type described it is desirable to provide common orientation of the articles for certain operations. Thus, field asparagus spears are aligned in common lengthwise orientation for operations such as cutting or trimming and filling cans. The present practice is to manually orient the spears, and this has a high labor content and is expensive. Orienting machines previously proposed to orient certain tapered products, such as husked corn, have not been widely accepted in view of their complexity, expense, and inability to handle products with little or no tapering, such as asparagus. The need has been recognized for an efficient and inexpensive method and apparatus for orienting products of the type described.

SUMMARY OF THE INVENTION AND OBJECTS

It is an object of the invention to provide method and apparatus of the type described which will efficiently handle elongated articles received in random lengthwise orientation and deliver the same in common orientation for further processing.

Another object is to provide method and apparatus which will provide relatively high capacity, which will orient the articles to a high degree of accuracy, and which will not cause injury to articles like asparagus.

Another object is to provide method and apparatus of the type described which will handle articles of disparate length and random lengthwise orientation and efficiently segregate the articles in common orientation and length classification.

Another object is to provide improved method and apparatus for orienting elongated articles which embody certain features disclosed in said copending U.S. Pat. No. 3,682,301.

A further object is to provide method and apparatus incorporating means providing at least two moving surfaces spaced apart to define a gap whereby in-feed articles of random orientation traveling on the first surface may tilt downwards into the gap with their heavier ends foremost, and are then collected and delivered in the desired orientation.

The method of the present invention moves the articles to be oriented in the general direction of their length along a path defined by moving surfaces that are separated by at least one gap of a length that is less than the length of the articles. The articles are caused to tilt about fulcrums near the margins of the gap and are then dropped through the gap with their heavier ends foremost. After dropping through the gap the articles are collected in such a manner as to provide the orientation desired. In various embodiments disclosed the moving surfaces may be formed by rollers or endless belt conveyors. Preferably a plurality of moving surfaces are employed with the surfaces separated by gaps of progressively increasing lengths. The apparatus for carrying out the method provides means for forming the surfaces over which the articles are carried, with the surfaces being spaced apart to form the gaps. Also means is provided for collecting the articles dropping through the gaps and for presenting them with the desired orientation.

BRIEF DESCRIPTION OF THE DRAWINGS

FIG. 1 is a schematic elevational view of an article orienting apparatus incorporating features of the invention;

FIG. 2 is an enlarged partial elevational view of the apparatus of FIG. 1 illustrating operation thereof;

FIG. 3 is a schematic elevational view of a modified form of the invention using belts;

FIG. 4 is an enlarged partial elevational view of the invention of FIG. 3 illustrating one stage in the operation thereof;

FIG. 5 is a view similar to FIG. 4 illustrating a further operating stage of the modified form;

FIG. 6 is a side elevational view of another form of the invention;

FIG. 7 is a cross section view taken along the line 7—7 of FIG. 6;

FIG. 8 is an end elevational view taken along the line 8—8 of FIG. 6;

FIG. 9 is a top plan view of the article feeding device for the orienting apparatus; and FIG. 10 is an elevational view in cross section taken along the line 10—10 of FIG. 9.

DESCRIPTION OF THE PREFERRED EMBODIMENTS

Referring now to the drawings and particularly FIG. 1, one form of the article orienting apparatus is illustrated schematically at 10. While orienting apparatus 10 will be explained in relation to handling elongated agricultural products, such as the exemplary asparagus spears 12, it is understood that the invention also has application in handling other elongated products or articles in which the center of gravity is displaced from the geometric center in a direction away from the lighter and toward the heavier end thereof, such as husked corn, or carrots, and the like.

Apparatus 10 comprises an in-feed means 14, orienting means 16, and discharge means 18. In-feed means 14 is shown as including a shaker-feeder apparatus 19 of the type described in FIGS. 9 and 10 which is adapted to orderly feed a plurality of randomly lengthwise oriented spears 12 of disparate lengths along multiple side-by-side lanes. The spears are delivered to orienting means 16 in the direction of their length along the relatively narrow lanes in single file order. Suitable guideway means, not shown, may be provided to constrain the articles for movement along each lane. While the operation of apparatus 10 will be described in relation to a schematic single-laned flow path it is understood that the invention would advantageously be employed with multiple side-by-side lanes for increased capacity. In such applications, in-feed means 14 would preferably comprise the multiple lane feeder apparatus 19.

Orientor stage 16 comprises a series of moving support surfaces defined by paired large and small roller units 20,22,24, 26,28,30. The roller units are transversely mounted on a suitable frame, not shown, as a continuation of each lane of in-feed stage 14. The roller units are spaced apart along the path of article movement to define a series of gaps 32,34,36,38,40 of progressively increasing gap length to handle a full range of article length. Suitable driving means, not shown, are provided to turn all rollers for conjoint clockwise rotation, as viewed in FIG. 1, to move the articles along the laned paths for both lengthwise orientation and length grading.

The commonly oriented articles are deposited below on discharge means 18, shown as endless conveyor 42, powered by suitable means to convey the articles to the left for further processing. The exemplary asparagus spears would be delivered by conveyor 42 for discharge onto a suitable cross-conveyor, not shown, for any subsequent trimming and canning operations. While a single discharge conveyor 42 is illustrated as receiving the oriented articles from the roller units, it is understood that the discharge means could also comprise a plurality of separate conveyors, not shown, disposed below one or more gaps to receive the respective articles and to convey the same segregated from the remaining articles. As such, apparatus 10 would thus be adapted to orient and also segregate as to length. Thus, one conveyor unit could be disposed below gap 32 to receive all short spears, a second conveyor unit could be disposed below gaps 34,36 and 38 to receive all medium length spears, and a third conveyor unit could be disposed below gap 40 to receive all long or oversized spears.

Referring to FIG. 2, details of the construction and operation of component roller units and gaps are illustrated. The first roller unit 20 comprises a relatively large diameter leading roller 44 axised transversely of the path of article movement, and a relatively small diameter trailing roller 46 axised parallel with roller 44 and positioned downstream thereof with the upper surfaces of both rollers aligned substantially horizontally. Similarly, roller unit 22 comprises paired large roller 48 and small roller 50, while roller unit 24 comprises paired large roller 52 and small roller 54. The rollers are preferably provided with a low friction surface for moving the spears, and are powered by suitable means, not shown, to turn in conjoint rotation clockwise as viewed in FIG. 2 for advancing spears 12 to the right. The smaller rollers provide a precise fulcrum point for forward tilting of the spears at the proper gap, while the larger rollers provide backward tilting and allow for a greater tolerance of spear curvature, as would exist with green asparagus. In one embodiment the ratio of larger to smaller roller diameters is 6:1, although this may be varied as, for example, by using a smaller ratio for handling articles with less curvature.

Roller units 20,22 are spaced apart along the path of article movement to define a gap 32 providing a predetermined gap length effective to drop out the shortest length spears received from the in-feed means. Roller units 22 and 24 are spaced apart to define gap 34 of increased gap length suitable to drop out and orient those spears of the next larger length increment. The remaining gaps 36–40 are successively increased for progressively dropping out and orienting spears of increasing lengths.

The articles or spears of a given length and having either butt-first, i.e., heavier end foremost, or tip-first, i.e., lighter end foremost, lengthwise orientation are oriented through a respective gap 32–40 corresponding to spear length by either forward or backward tilting by gravital action. All spears tilting through the gaps drop downwardly in butt-first orientation where they fall onto the upper reach of conveyor belt 42. Belt 42 collects the oriented spears in common butt-first orientation, and directs them to the left as viewed in FIG. 2. The upper reach of belt 42 thus moves in the same direction as the lower margin of each large diameter roller 44,48 thereby minimizing the possibility of any obstruction of the articles between the belt and the rollers.

In operation, orientation of the exemplary butt-first oriented spear 12 will be explained in relation to gap 32, as illustrated in FIG. 2. This gap orients the shorter spears having a length from the butt end to the center of gravity 56 sufficiently short to tilt downwardly and clear the gap. These spears of butt-first orientation are first propelled over the gap by the rollers, and when center of gravity 56 clears small roller 46 the spears tilt by gravital action with the small roller acting as a fulcrum. The center of gravity to butt end length of this short spear permits it to clear the leading edge of roller 48 and drop butt-first to the position at 12a. Conveyor 42 picks up the spear and moves it to the left in butt-first orientation to the position 12b. The longer butt-first spears will continue over the succeeding roller pairs until they drop through a sufficiently large gap.

The operation of orientor 10 in handling those spears of tip-first orientation is illustrated in FIG. 2 in relation to gap 34. An exemplary tip-first spear 57 is illustrated as having a center of gravity 59 to butt end length sufficient to permit it to bridge and clear gap 32 so that roller unit 22 is effective to drive it over gap 34. the center of gravity to tip end length of this spear first bridges the gap as the tip contacts the leading edge of next roller 52, preventing it from falling tip-first through the gap. Both roller units 22 and 24 combine to further drive the spear until its butt end clears small roller 50. The center of gravity to butt end length of this spear is short in relation to gap length 34 so that the spear will tilt and slide backwards by gravital action to the position at 57a. The spear will continue to slide through the gap in butt-first orientation at 57b and fall onto conveyor 42 for movement to the left together with other butt-first oriented spears.

As the spears move in either butt-first or tip-first orientation across the rollers the fulcrum points about which the spears pivot will continuously change. Thus, for a butt-first oriented spear 12 the fulcrum point defined by small roller 46 continuously increases from center of gravity 56 as the spear advances across the gap. For tip-first oriented spear 57 the fulcrum determined by large roller 52 tends to decrease from the spear's center of gravity as the spear advances, but the kinetic energy from the drop will carry the spear down when it is at the proper gap.

FIG. 3 illustrates generally at 58 another form of the article orienting apparatus of the invention. This apparatus employs a series of tandem conveyor belts for the orienting and grading operations. Apparatus 58 includes orientor means 62 and discharge means 64.

An in-feed means 60 is provided receiving the exemplary asparagus spears 68 of random lengthwise orientation and disparate lengths from a suitable metering device such as the discharge end 70 of the shaker-feeder apparatus 118 of said U.S. Pat. No. 3,682,291. While the operation of apparatus 62 will be described schematically in relation to spears advancing along a narrow, single lane, it is understood that the invention would advantageously incorporate a plurality of side-by-side lanes for increased capacity.

Orientor means 62 comprises a series of moving surfaces defined by tandem conveyors 71,72,74,76,78 spaced apart along the direction of article movement to define a series of gaps 80,82,84,86 of progressively increasing gap length for grading and orienting a full range of article lengths. The gaps both orient and grade those spears having a center of gravity to butt end length corresponding to respective gap lengths by forward tilting of butt-first spears and backward tilting and sliding of tip-first spears. The conveyor arrangement of orienter 62 results in the gap opening or length being less critical to spear length for an orienting operation so that fewer gaps are needed to maintain a high orienting efficiency as compared to a vibrating type orientor, for example.

Each conveyor 71–78 comprises an endless belt trained between a large diameter leading pulley and relatively small diameter trailing pulley. In FIG. 4 exemplary conveyor 72 is shown as including a large diameter lead pulley 88 and small diameter trailing pulley 90 supporting endless belt 92. The smaller pulleys provide a precise fulcrum for forward tilting, while the larger lead pulleys allow for a greater tolerance of curved spears for backward tilting. Suitable driving means, not shown, are provided to turn all pulleys clockwise as viewed in FIG. 3 for moving spears 68 to the right across successive gaps, with the spears dropping out in butt-first orientation as they reach the gaps.

The first gap 80 is defined by the relatively small diameter trailing pulley 94 of conveyor 71 and lead pulley 88 of conveyor 72. The remaining gaps are defined between respective trailing and lead pulleys of the conveyors.

Discharge means 64 comprises a series of collector chutes to receive and distribute the spears dropping through the orienting gaps. A downward inclined collector chute 96 is provided below gap 80, chute 98 is provided below gap 82, chute 100 is provided below gap 84, and chute 102 is provided below gap 86. An overlength bin 104 or suitable conveyor, not shown, may be provided at the discharge end of conveyor belt 78 to receive all overlength spears not graded and oriented in the preceding gaps. The spears advance down the chutes in butt-first orientation and are either collected together or segregated as to length for subsequent processing. A cross-transfer conveyor 106, preferably of the endless belt type, may be provided at the discharge end of chute 96 to receive the shortest spears graded out and separately convey them to a cutting or trimming operation. The spears of medium length graded through gaps 82 and 84 may be collected together and segregated from the other spears by suitable means such as a collector conveyor 108 disposed below the discharge ends of chutes 98 and 100. Conveyor 108 in turn discharges onto a cross transfer endless conveyor 110 for delivering the medium length spears to a subsequent operation. A cross transfer endless conveyor 112 is provided below the discharge end of chute 102 to receive the long spears graded through gap 86 for delivery to the subsequent operation. It is also contemplated that one or more collector conveyors may be provided for collecting together spears from any number of chutes, or the graded spears from each chute can be segregated from each other for separate processing, as desired.

Operation of orientor 58 in handling an exemplary butt-first oriented spear 114 of the shorter length is illustrated in FIG. 4, and the operation in handling an exemplary tip-first oriented spear 116 of the same length is illustrated in FIG. 5. Those longer spears of either orientation will continue on the conveyors until graded and separated in the succeeding gaps in a similar manner.

As butt-first spear 114 advances along conveyor 71 it will begin to tilt by gravital action as its center of gravity clears the top of roller 94. Since the center of gravity to butt end length of this spear is less than gap length 80 it will drop clear of large diameter roller 88, as shown at position 114a. The spear will continue to drop onto chute 96 in the position 114b and slide down this chute onto the transfer conveyor. Those butt-first oriented spears of greater center of gravity to butt end length will bridge the gap and continue on conveyor belt 92 to the next gap.

The tip-first oriented spear 116 of FIG. 5 advances from the end of roller 94 across the gap. Since the center of gravity to tip end length of this spear is greater than gap length 18 the spear will bridge the gap in the position at 116 above roller 88. As the butt-end of this spear moves from small diameter roller 94 it will drop to the position at 116b and tilt and slide backward by gravital action since its center of gravity to butt end length is less than gap length 80. Continued sliding of the spear moves it successively to positions 116c and 116d where it moves onto chute 96 in butt-first orientation. Those tip-first spears of greater length will not tilt or slide backwards sufficiently to drop through the gap and are advanced on belt 92 to the succeeding gaps.

FIGS. 6–8 illustrate another embodiment of the invention providing apparatus 120 which is specially adapted to handle elongate articles in which the center of gravity to geometric center length differential is relatively small, and therefore precise sensing of the center of gravity is required for efficient tilting action. The method and apparatus of this embodiment finds particular application in orienting cut and blanched asparagus for subsequent hand canning operations, and for orienting or size grading of white asparagus, both types of asparatus articles being characterized in having a relatively small center of gravity to geometric center dimension.

Apparatus 120 comprises an in-feed means 122, orienting means 124, discharge means 126, and article collecting means 128. In-feed means 122 is adapted to feed the exemplary asparagus spears in single-file order along multiple side-by-side lanes by means of a feeder apparatus 122 of the type described in FIGS. 9–10. When used in handling blanched asparagus, in-feed means 122 receives the cut and blanched spears from size grading and hand sorting operations. Orienting means 124 aligns the spears with a common orientation for delivery onto discharge means 126 which in turn feeds into article-collecting means 128 for delivery in common lengthwise orientation to a hand canning operation.

Orienting means 124 comprises a series of moving support surfaces defined by a plurality of transversely axised rollers 130 spaced apart along the path of article movement to form a series of gaps 132 of progressively increasing lengths. These gap lengths are less than the length of the articles so that the articles are caused to tilt about a fulcrum defined by the rollers and drop through a respective gap with their heavier ends foremost.

The diameters of rollers 130 are of a relatively smaller size as compared with the rollers of the embodiment of FIGS. 1-2 to provide a more precise sensing of the article's center of gravity for more effective orienting. Preferably the rollers 130 are sized with diameters which are not greater than about one-half the average length of the articles. Where the articles are cut and blanched asparagus spears the rollers would be sized with diameters within the range of 1 to 1.5 inches.

The rollers 130 are rotatably supported on a frame 134 by suitable bearings 136. The rollers are powered to turn in conjoint clockwise rotation, as viewed in FIG. 6, by a suitable motor and belt or chain-type drive, not shown.

The roller axes are spaced apart with center-to-center dimensions which progressively increase by small increments to accommodate a range of article lengths. For example, apparatus adapted to handle blanched asparagus spears is provided with the center-to-center dimension of the upstream first pair of rollers 130 sized on the order of 2.5 inches, and with each successive center-to-center dimension increasing on the order of 0.125 inches.

A relatively larger diameter feed roller 138 is rotatably mounted below the discharge end of feeder apparatus 122 and powered to turn clockwise as viewed in FIG. 6 to feed the articles onto the first roller 130. Guide means are provided to constrain the articles for movement along individual lanes over the rollers 130 as a continuation of the lanes of feeder apparatus 122. This guide means includes a plurality of upper lane guides depending from a support frame 142 which in turn is resiliently mounted by means of rubber belting 144 to an overhead frame 146. The upper lane guides 140 are transversely spaced apart and extend the length of the orienting paths to prevent sideways turning of the articles which could result in the articles dropping through the gaps with improper lengthwise orientation. Means comprising a powered vibrator device 148 mounted on frame 142 is provided to vibrate the lane guides and assist article movement by preventing article hang-up and obstruction.

A plurality of lower lane guides 150 are mounted below the rollers 150 in registry with respective upper guides 140. These guides 150 are transversely spaced apart and extend along the path of article movement to direct the articles onto discharge stage 126. Each adjacent pair of the guides 150 define spaced walls diverging upwardly to direct the oriented articles downwardly in a manner preventing article hang-up.

Discharge stage 126 comprises a series of transversely spaced apart endless discharge conveyor belts 152 trained between a tail pulley 154 and lead pulley 156. Either of the pulleys 154,156 are powered by suitable means to move the upper reach of the discharge belts 152 in a direction to the right as viewed in FIG. 6 for moving the oriented articles toward article-collecting means 128.

Article-collecting means 128 comprises a cross transfer conveyor 158 of the endless belt type powered by suitable means so that its upper flight moves to the left as viewed in FIG. 8 toward a canning station, not shown. The collecting means further includes flighted guide apparatus 160 which functions in cooperation with conveyor 158 to receive the oriented articles from discharge conveyor belts 152 in a discharge zone and retain the desired orientation while conveying the articles away from the discharge zone for further processing, e.g., toward the canning station for applications where the articles are blanched asparagus spears. An upstanding backplate 178 is mounted along leading section 174 of flighted guide apparatus 160 and on a side thereof opposite the discharge ends of discharge conveyor belts 152. Backplate 178 functions to stop the movement of articles discharging from the belts for momentary retention in the discharge zone. Flighted guide apparatus 160 comprises paired endless chains 162 carrying flights of spaced-apart laterally extending guides 164. Chains 162 are trained between a drive pulley 166 powered by a suitable motor through drive chain 168, intermediate idler sprockets 170, and trail sprocket 172. The lower reach of the chains 162 follows a path defining a leading section 174 adjacent the discharge zone of discharge conveyor belts 152, and a trailing section 176. Flighted guide apparatus 160 is operated so that the lower reach of the chains 162 moves to the left in conjoint motion with that of underlying cross-transfer conveyor 158. The guides 164 thus cooperate with the upper surface of conveyor 158 to define a series of moving pockets for receiving and collecting together articles of common orientation. The trailing section 176 of the flighted chain diverges upwardly from conveyor 158 so that the guides progressively move away from the collected articles. Continued movement of conveyor 158 carries the articles to the next station, e.g., a canning station where workers standing on either side of the conveyor 158 can easily grasp a number of commonly oriented asparagus spears for placing the same into cans.

The operation of the embodiment of apparatus 120 will be explained in relation to the orientation of cut and blanched asparagus spears which are received in random orientation from size grading and hand sorting operations. The spears are advanced in multiple side-by-side lanes in singulated order by means of shaker-feeder apparatus 122 discharging onto feed roller 138. The feed roller together with the orienting rollers 130 are turned in conjoint rotation clockwise as viewed in FIG. 6 to advance the spears in single-file order along the multiple paths defined between upper lane guides 140. Vibrator apparatus 148 is operated to impart vibratory motion to the upper lane guides for preventing hang-up of the spears. As the spears are advanced across the relatively small diameter rollers 130 they drop through the gaps 132 with their heavier ends foremost. The rollers 130 are of a diameter in relation to spear length which is most effective to sense the spear's center of gravity in relation to its geometric center. The spears are caused to tilt about a fulcrum defined by the rollers. The shortest spears of heavier end foremost orientation are caused to tilt about the first roller 130, while the shortest spears of lighter end foremost orientation progress across the gap and then tilt backwards about the second roller 130. Longer spears which bridge the first gap 132 will continue along the path of progressively increasing gap lengths until reaching a gap which is effective to tilt the spear. All spears thus drop through the gaps in heavier end foremost orientation and are deposited upon the upper reaches of discharge conveyor belts 152. The upwardly diverging sidewalls of lower lane guides 150 function to direct the spears downwardly onto belts 152 so that the spears do not hang up. Discharge belts 152 move the spears in common orientation toward article collecting means 128. Spears discharging from the belts 152 are deposited in the series of pockets formed between flighted guides 164 and the upper reach of cross-transfer conveyor 158. The flighted guides collect the spears in common orientation after which the guides diverge upwardly from these spears, which then continue on the surface of conveyor 158 to the canning station where workers pick up a number of the commonly oriented spears for deposit in cans.

FIGS. 9 and 10 illustrate generally at 179 a shaker-feeder apparatus for metering articles in a controlled feed for discharge in multiple lanes to, for example, the orienting and grading apparatus described herein. Shaker-feeder 19 receives a load of randomly oriented articles, such as the exemplary asparagus spears, and delivers them onto the orientor lanes in single file, evenly spaced distribution with a substantially even rate of feed, or singulation, between the lanes to achieve optimum line capacity and increased overall operating efficiency.

Shaker-feeder 179 comprises a shaped bed member 180, which may be of sheet-metal construction, having an integral upwardly opening V-shaped in-feed section 182, a pair of downwardly inclined diverging V-shaped distributor troughs or channels 184,186 and a series of parallel V-shaped lanes 188–198.

As illustrated in FIG. 10, bed member 180 is supported by a frame 200 mounted by suitable means such as resilient mountings 202,204 for vibrating or oscillating motion through eccentric drive means 206.

Each of the lanes 188–198 are formed with an upwardly opening V-shaped cross-sectional configuration effective to catch individual spears cascading down troughs 184,186 and direct them in single file order onto the lanes of the orientor. The exemplary lane 196 includes an upper V-shaped section 208 on the inner side of trough 186 and a downwardly inclined V-shaped section 210 disposed on an inclined flat surface of the bed member and terminating at discharge end 212 above a relatively narrow lane 214 of an orientor 216. A plurality of openings 218 are provided between the spaced apart lane ends. Overflow spears which cascade down the flat surface of the bed member without feeding into any of the lanes fall through the openings 218 onto a collector chute 220 which directs the overflow onto cross conveyor belt 222 for collection and subsequent recycling, as desired. Similarly, the lower ends of distributor troughs 184,186 discharge excess spears onto conveyor 222 for recycling.

Under-length articles and broken short articles drop out at the gap between the lane ends 212 and the first roller of orientor 216. The gap can be adjusted to drop out the minimum size desired. Conveyor 222 takes away the under-length articles.

In operation of the shaker-feeder, bed member 200 is vibrated through operation of eccentric drive 206 and a load of the spears is placed on in-feed trough 182. The spears vibrate down the incline of the distributor troughs 184,186 where they catch on upper sections 208 of the parallel V-shaped lanes. The spears cascade from one lane to the next until all lanes are filled, with the excess dropping from the troughs onto chute 220 and overflow conveyor 222. Continued shaking of bed member 200 advances the spears in the individual lanes down the incline of the bed for discharge in single file order onto the multiple lanes of the orientor. Overflow spears which advance down the bed between the lanes will fall through the openings 218 onto overflow conveyor 222 for recycling. Feeding of an excess of spears in this manner insures that all lanes are properly filled for increased operating efficiency. This reduces the possibility of gaps occurring in the feeding of articles onto the lanes.

From the foregoing it is apparent that there has been provided a new and improved method and apparatus for handling elongated articles such as agricultural products having a center of gravity displaced lengthwise from the geometric center. While the foregoing embodiments are considered to be preferred, it is understood that numerous variations and modifications in the steps and arrangement of parts may be made by those skilled in the art within the principle and scope of the invention as expressed in the appended claims.

I claim:

1. Apparatus for handling elongated articles of the type having a center of gravity displaced from the geometric center in a direction away from the lighter and toward the heavier end thereof, means forming first and second support surfaces adapted to move articles supported thereon along a predetermined path, the surfaces being spaced apart along the path to define at least one gap of a length less than the length of the articles, said means also forming at least one fulcrum near one margin of the gap over which articles are adapted to tilt, articles moved into the region of the gap being caused to tilt about the fulcrum to drop through the gap, and means for collecting the articles dropping through the gap including a cross conveyor having an upper reach positioned to receive in a discharge zone articles of common orientation which have dropped through the gap, means to direct said articles dropping through the gap to said cross conveyor means in an alignment which is transverse of said upper reach, means forming a plurality of flighted guides extending above said conveyor upper reach to define a series of article-collecting pockets therewith, and means to move the flighted guides in conjoint movement with said conveyor upper reach to move articles collected within said pockets away from the discharge zone.

2. Apparatus as in claim 1 in which the flighted guide means comprises means forming a lower reach defining a leading section disposed substantially parallel with said cross conveyor upper reach to define said pockets therewith and a trailing section diverging upwardly from said conveyor upper reach in the direction of conveyor movement.

3. In apparatus for orienting asparagus spears each having a center of gravity displaced from the geometric center in a direction away from the lighter tip-end and toward the heavier butt-end thereof, means forming first and second moving supporting surfaces adapted to support and move asparagus spears in the direction of their length along a pre-determined path, the surfaces being disposed along the path of movement to define at least one downwardly open gap of a length less than the length of the spears and interposed across the path, the moving surfaces serving to form near and far margins of the gap, the configuration of such margin forming surfaces as viewed from the side of the gap being arcuate, with the moving surface forming the near margin being on a radius substantially less than the radius of the moving surface forming the far margin, the spears moving butt-end first into the region of the gap over the near margin of the gap being caused to tilt forwardly and thereafter drop butt-end first through the gap, certain spear moving tip-end first into the region of the gap being caused to engage the moving surface forming the far margin of the gap while the butt-end thereof continues to be supported by the surface forming the near margin of the gap whereby such spears are carried across the gap, and means for collecting the spears dropping through the gap without altering their orientation.

4. Apparatus as in claim 3 in which the means for supporting and moving spears toward the gap comprises two adjacent rollers of different diameters mounted on horizontal parallel axes extending at right angles to said path, the roller of smaller diameter forming the near margin of the gap, the means for supporting and moving spears beyond the far margin of the gap being formed by two rollers of different diameters likewise mounted on horizontal parallel axes extending at right angles to said path, the roller of larger diameter forming the far margin of the gap.

5. Apparatus as in claim 3 in which the means for supporting and moving spears comprises two endless belts engaging pulleys rotatable on horizontal parallel axes, the pulleys having different diameters, the protion of one belt engaging the pulley of smaller diameter forming the near margin of the gap and the belt portion engaging the pulley of larger diameter forming the far margin of the gap.

6. Apparatus as in claim 3 in which the portion of the moving surfaces forming said far margin of the gap lies at least partially in a plane spaced vertically below a plane passing at least partially through the portion of the moving surfaces forming said near margin of the gap.

7. In a method for orienting asparagus spears of random orientation and lengthwise curvature, each spear having a center of gravity displaced from the geometric center in a direction away from the lighter tip and towards the heavier butt-end thereof, the method making use of means forming spaced apart moving surfaces for supporting and moving the spears in the direction of their length and forming a downwardly open gap therebetween interposed across the path of movement, the steps of causing the surfaces to move continuously in one direction along the path to support and move spears having a given length range and that are oriented butt-end first into the region of the gap and over the near margin of the same whereby a progressively increasing butt-end portion of each such spear is unsupported, the remaining tip-end portion of each such spear being unrestrained against movement away from the adjacent supporting surface, causing each such spear to project over said gap sufficiently far to rotate forwardly in a vertical plane coincident with the longitudinal axis of the spear and about the near margin of the gap when the unsupported butt-end portion thereof over balances the supported tip-end portion, causing each such spear after such rotation to drop through the gap free of the supporting surfaces and butt-end first, causing the surfaces to support and move other and longer ones of the spears tip-end first into the region of the gap over the near margin of the same whereby an increasing tip-end portion of each such other spears is unsupported, maintaining the width of said gap such that the tip-end portion of each such other longer spear engages and is supported by a moving surface on the far side of the gap while the butt-end portion of the spear continues to be supported at the near margin of the gap, causing the last mentioned spear to be carried over the gap and over the far margin of the same, and causing spears falling through the gap to fall butt end first onto a moving surface, all in the same orientation.

8. A method as in claim 7 in which additional ones of the spears moving tip-end first and which are within a range of length shorter than said given length range are caused to move into the region of the gap over the near margin of the same whereby a progressively increasing tip-end portion of each said spear is unsupported, the tip-end portion of each such spear caused to engage a moving surface at the far margin of the gap, and the butt-end portion of each such spear caused to drop downwardly through the gap with backward rotation of the spear in said vertical plane and with th tip-end portion dropping free from the supporting surface at the far margin of the gap.

* * * * *